United States Patent
Xiong (10) Patent No.: US 10,728,794 B2
(45) Date of Patent: Jul. 28, 2020

(54) NETWORK TERMINAL DEVICE COMMUNICATION METHOD AND APPARATUS

(71) Applicant: Huawei Technologies Co., Ltd., Shenzhen (CN)

(72) Inventor: Xin Xiong, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/899,272

(22) Filed: Feb. 19, 2018

(65) Prior Publication Data

US 2018/0184323 A1 Jun. 28, 2018

Related U.S. Application Data

(63) Continuation of application No. PCT/CN2015/087582, filed on Aug. 20, 2015.

(51) Int. Cl.
*H04W 28/02* (2009.01)
*H04W 76/12* (2018.01)
(Continued)

(52) U.S. Cl.
CPC ......... *H04W 28/0268* (2013.01); *H04W 8/24* (2013.01); *H04W 8/26* (2013.01); *H04W 76/11* (2018.02); *H04W 76/12* (2018.02); *H04W 76/27* (2018.02); *H04W 84/045* (2013.01); *H04W 28/085* (2013.01); *H04W 52/0203* (2013.01); (Continued)

(58) Field of Classification Search
CPC ..... H04W 8/24; H04W 8/26; H04W 28/0268; H04W 28/085; H04W 40/04; H04W 52/0203; H04W 76/11; H04W 76/12; H04W 76/27; H04W 84/045; Y02D 70/00; Y02D 70/10; Y02D 70/12; Y02D 70/122; Y02D 70/124; Y02D 70/126; Y02D 70/1224; Y02D 70/1242; Y02D 70/142

See application file for complete search history.

(56) References Cited

U.S. PATENT DOCUMENTS 6,434,620 B1 * 8/2002 Boucher ............... H04L 29/06 709/230
9,277,429 B2 * 3/2016 Javed .................. H04L 43/12
(Continued)

FOREIGN PATENT DOCUMENTS

| CN | 101400148 A | 4/2009 |
|----|-------------|--------|
| CN | 101459906 A | 6/2009 |
| CN | 102244855 A | 11/2011 |
| CN | 103428768 A | 12/2013 |
| EP | 2947936 A1 | 11/2015 |

(Continued)

*Primary Examiner* — Luat Phung
*Assistant Examiner* — Thomas R Cairns
(74) *Attorney, Agent, or Firm* — Slater Matsil, LLP (57) ABSTRACT

A network terminal device communication method is provided. After a wireless terminal device establishes an RRC connection to a base station, a control plane connection to an MME, and a user plane bearer with a P-GW, the base station determines that a network terminal device uses a user plane bearer between the base station and the P-GW, which is established by the wireless terminal device to transmit user plane data of the network terminal device. The base station releases an air interface connection between the wireless terminal device and the base station, or the wireless terminal device enters a power saving state.

18 Claims, 6 Drawing Sheets

(51) Int. Cl.
  *H04W 76/11* (2018.01)
  *H04W 76/27* (2018.01)
  *H04W 8/24* (2009.01)
  *H04W 8/26* (2009.01)
  *H04W 84/04* (2009.01)
  *H04W 28/08* (2009.01)
  *H04W 52/02* (2009.01)

(52) U.S. Cl.
  CPC .............. *Y02D 70/00* (2018.01); *Y02D 70/10* (2018.01); *Y02D 70/12* (2018.01); *Y02D 70/122* (2018.01); *Y02D 70/124* (2018.01); *Y02D 70/126* (2018.01); *Y02D 70/1224* (2018.01); *Y02D 70/1242* (2018.01); *Y02D 70/1262* (2018.01); *Y02D 70/142* (2018.01)

(56) References Cited

U.S. PATENT DOCUMENTS

| | | | |
|---|---|---|---|
| 10,129,802 B2* | 11/2018 | Pelletier | H04W 76/27 |
| 2011/0075675 A1 | 3/2011 | Koodli et al. | |
| 2013/0070710 A1 | 3/2013 | Guo | |
| 2013/0265884 A1 | 10/2013 | Brombal et al. | |
| 2013/0311597 A1* | 11/2013 | Arrouye | G06F 9/5072 |
| | | | 709/217 |
| 2014/0078898 A1* | 3/2014 | Anchan | H04W 28/0268 |
| | | | 370/230 |
| 2014/0126538 A1 | 5/2014 | Mihaly et al. | |
| 2015/0071063 A1 | 3/2015 | Zhou et al. | |

FOREIGN PATENT DOCUMENTS

WO  2014112001 A1  7/2014

* cited by examiner

NETWORK TERMINAL DEVICE COMMUNICATION METHOD AND APPARATUS

CROSS-REFERENCE TO RELATED APPLICATIONS

This application is a continuation of International Application No. PCT/CN2015/087582, filed on Aug. 20, 2015, the disclosure of which is hereby incorporated by reference in its entirety.

TECHNICAL FIELD

The present disclosure relates to the field of communications technologies, and in particular, to a network terminal device communication method and an apparatus.

BACKGROUND

As a 5G technology imposes a stricter requirement on latency, mobile edge computing (MEC) provides IT (internet technology) and cloud computing capabilities for a mobile user in a radio access network (RAN). For an application developer and a content provider, a RAN provides a service environment featuring a short distance, an ultra-low latency, high bandwidth, real-time access to wireless network information, and location identification, so as to accelerate development of content, services, and applications, and maintain user experience in different wireless and network conditions.

A main MEC implementation is deploying third-party applications and services on a RAN side, that is, flexibly and rapidly deploying various applications and services by opening the IT and cloud computing capabilities on the RAN side, thereby providing differentiated mobile broadband user experience. However, direct manual intervention is not required in heavy-traffic upload and download services (such as transmission of movies, videos, photos, or files). Even though the MEC implementation is used, a terminal is always needed in a service transmission process. As a result, terminal power is wasted and a wireless air interface resource is consumed.

SUMMARY

Embodiments of the present invention provide a network terminal device communication method and an apparatus to resolve a problem that power of a wireless terminal device and a wireless air interface resource are wasted in service transmission.

According to a first aspect, a base station is provided, and the base station includes a processing module, configured to: after a wireless terminal device establishes an Radio Resource Control Protocol (RRC) connection to the base station, a control plane connection to an MME, and a user plane bearer with a PDN (packet data network) gateway (P-GW), determine that a network terminal device uses a user plane bearer that is between the base station and the P-GW and that is established by the wireless terminal device to transmit user plane data of the network terminal device, where the wireless terminal device and the network terminal device have a same terminal device identifier.

With reference to the first aspect, in a first possible implementation, the network terminal device is located in the base station as a storage extension of the wireless terminal device; or the network terminal device serves as an independent logical network element on an EUTRAN (evolved universal terrestrial radio access network), and is connected to the base station through a wired interface.

With reference to the first aspect and the first possible implementation of the first aspect, in a second possible implementation, the processing module is specifically configured to: obtain at least one of control information, radio link quality information, or service QoS (quality of service) of the wireless terminal device; and determine, according to the at least one of the control information, the radio link quality information, or the service QoS, that the network terminal device uses the user plane bearer that is between the base station and the P-GW and that is established by the wireless terminal device.

With reference to any one of the first to the second possible implementations of the first aspect, in a third possible implementation, the base station further includes: a sending module, configured to send a context setup message to the network terminal device, where the context setup message carries at least a base station IP (internet protocol) address and a context of the wireless terminal device, and the context setup message is used to establish a user plane bearer between the network terminal device and the base station.

With reference to any one of the first to the third possible implementations of the first aspect, in a fourth possible implementation, the processing module is further configured to: release an air interface connection between the wireless terminal device and the base station, or instruct the wireless terminal device to enter a power saving state.

With reference to the third or the fourth possible implementation of the first aspect, in a fifth possible implementation, the processing module is further configured to perform the following.

Search a mapping table that is stored in the base station and that is of a wireless terminal device identifier and a network terminal device IP address, for a network terminal device IP address corresponding to the wireless terminal device.

The sending module is specifically configured to send the context setup message to a network terminal device corresponding to the network terminal device IP address found by the processing module.

With reference to any one of the first to the fifth possible implementations of the first aspect, a sixth implementation includes: the user plane bearer that is between the base station and the P-GW and that is established by the wireless terminal device includes: a user plane bearer between the base station and the serving gateway (S-GW), and a user plane bearer between the S-GW and the P-GW.

With reference to the fifth possible implementation of the first aspect, in a seventh implementation, the wireless terminal device identifier includes an international mobile subscriber identity (IMSI), a globally unique temporary identity (GUTI), a UE (user equipment) IP address, or a cell radio network temporary identifier (C-RNTI).

Information about the service QoS includes a quality of service class identifier (QCI), a Per access point name-aggregate maximum bit rate (APN-AMBR), or a traffic flow template (TFT).

According to a second aspect, a network terminal device communication method is provided. A terminal device includes a wireless terminal device and a network terminal device, and the wireless terminal device and the network terminal device have a same terminal device identifier. The method includes that, after the wireless terminal device establishes an RRC connection to a base station, a control plane connection to an MME, and a user plane bearer with a P-GW, determining, by the base station, that the network terminal device uses a user plane bearer that is between the base station and the P-GW and that is established by the wireless terminal device to transmit user plane data of the network terminal device.

With reference to the second aspect, in a first possible implementation, the network terminal device is located in the base station as a storage extension of the wireless terminal device; or the network terminal device serves as an independent logical network element on an EUTRAN, and is connected to the base station through a wired interface.

With reference to the second aspect and the first possible implementation of the second aspect, in a second possible implementation, the determining includes obtaining, by the base station, at least one of control information, radio link quality information, or service QoS of the wireless terminal device. The determining also includes determining, by the base station according to the at least one of the control information, the radio link quality information, or the service QoS, that the network terminal device uses the user plane bearer that is between the base station and the P-GW and that is established by the wireless terminal device.

With reference to any one of the second aspect or the first to the second possible implementations of the second aspect, in a third implementation, the method further includes sending, by the base station, a context setup message to the network terminal device, where the context setup message carries at least a base station IP address and a context of the wireless terminal device, and the context setup message is used to establish a user plane bearer between the network terminal device and the base station.

With reference to any one of the second aspect or the first to the third possible implementations of the second aspect, in a fourth possible implementation, the method further includes releasing, by the base station, an air interface connection between the wireless terminal device and the base station, or instructing the wireless terminal device to enter a power saving state.

With reference to any one of the second aspect or the first to the fourth possible implementations of the second aspect, in a fifth implementation, before the base station sends the context setup message to the network terminal device, the method further includes searching, by the base station, a mapping table that is stored in the base station and that is of a wireless terminal device identifier and a network terminal device IP address, for a network terminal device IP address corresponding to the wireless terminal device.

The sending, by the base station, a context setup message to the network terminal device includes sending, by the base station, the context setup message to the network terminal device corresponding to the found network terminal device IP address.

With reference to the fifth possible implementation of the second aspect, in a sixth implementation, the wireless terminal device identifier includes the following.

The wireless terminal device identifier includes an IMSI, a GUTI, a UE IP address, or a C-RNTI.

Information about the service QoS includes a QCI, a APN-AMBR, or a TFT.

With reference to the second aspect, in an seventh implementation, the user plane bearer that is between the base station and the P-GW and that is established by the wireless terminal device includes a user plane bearer between the base station and the S-GW, and a user plane bearer between the S-GW and the P-GW.

According to a third aspect, a network terminal device communication system is provided, where the system includes a wireless terminal device, a network terminal device, and the base station according to the first aspect and the first to the seventh possible implementations, and the wireless terminal device and the network terminal device have a same terminal device identifier.

With reference to the third aspect, in a first possible implementation, the wireless terminal device is configured to establish an RRC connection to the base station, a control plane connection to an MME, and a user plane bearer with a P-GW. The network terminal device is also configured to establish a user plane bearer between the network terminal device and the base station, and use the user plane bearer between the network device and the base station and a user plane bearer that is between the base station and the P-GW and that is established by the wireless terminal device to transmit user plane data.

With reference to the third aspect and the first possible implementation of the third aspect, in a second possible implementation, the network terminal device is located in the base station as a storage extension of the wireless terminal device. Alternatively, the network terminal device serves as an independent logical network element on an EUTRAN, and is connected to the base station through a wired interface.

In the embodiments of the present invention, after the wireless terminal device establishes the RRC connection to the base station, the control plane connection to the MME, and the user plane bearer with the P-GW, it is determined that the network terminal device uses the user plane bearer that is between the base station and the P-GW and that is established by the wireless terminal device to transmit the user plane data of the network terminal device. In this way, the base station releases the air interface connection between the wireless terminal device and the base station in time, or the wireless terminal device enters the power saving state, thereby avoiding a prior-art problem that a wireless terminal is always needed in a service transmission process and power of the terminal is wasted and a wireless air interface resource is consumed.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

Technologies described in this specification may be applied to various communications systems, for example, current 2G and 3G communications systems and a next-generation communications system, for example, a Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency Division Multiple Access (OFDMA) system, a single-carrier FDMA (SC-FDMA) system, a General Packet Radio Service (GPRS) system, a Long Term Evolution (LTE) system, and other communications systems.

Various aspects are described in this specification with reference to a wireless terminal device and/or a base station.

A wireless terminal may be a device that provides a user with voice and/or data connectivity, a handheld device with a wireless connection function, or another processing device connected to a wireless modem. The wireless terminal may communicate with one or more core networks over a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a remote station, an access point, a remote terminal, an access terminal, a user terminal, a user agent, a user device, or user equipment (UE).

The base station (for example, an access point) may be a device that is in an access network and communicates, over an air interface, with the wireless terminal through one or more sectors. The base station may be configured to mutually convert a received over-the-air frame and an IP packet and serve as a router between the wireless terminal and a remaining portion of the access network, where the remaining portion of the access network may include an Internet Protocol (IP) network. The base station may further coordinate attribute management of the air interface. For example, the base station may be a base transceiver station (BTS) in the GSM or the CDMA, may be a NodeB in the WCDMA, and may further be an evolved NodeB (eNB or e-NodeB) in the LTE, and this is not limited in this application.

It should be noted that a core network node device provided in embodiments of the present invention may be applied to different communications network systems, which includes but is not limited to an SAE (System Architecture Evolution)/LTE network, a UMTS (Universal Mobile Telecommunications System) network, and CDMA. The core network node device includes but is not limited to a mobility management entity (MME), a serving GPRS support node (SGSN), or a mobile switching center (MSC), which is not limited herein. For example, for the SAE/LTE network, the core network node device may be the MME, and a radio access node device may be an eNB; for the UMTS network, the core network node device may be the SGSN or the MSC, and a radio access node device may be an RNC or a NodeB. The following provides descriptions by using an example in which a cellular network is the SAE/LTE network, and for implementation of another cellular network, reference is made to the following embodiment.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The following describes solutions in the embodiments of the present invention in detail with reference to this specification.

In the embodiments of the present invention, a network terminal device and a wireless terminal device may have a same terminal identifier, and the network terminal device serves as an independent logical network element on an EUTRAN, and is connected to a base station through a wired interface or a WiFi manner. The network terminal device may also be disposed at different locations on a network side. For example, the network terminal device may be disposed in a macro base station, a single radio controller (SRC), or in a home eNodeB (HeNB). These disposing locations are merely examples of embodiments of the present invention, and all disposing locations shall fall within the protection scope of the present disclosure provided that the network terminal device can be a proxy of the wireless terminal device to communicate with a network.

User plane data in the embodiments of the present invention may be upload or download data, that is, transmitted or stored videos, photos, movies, big data files, or the like; or service data such as non-real-time service data or services data of data collection, periodic detection, or highly complex computing; or service data that requires no direct manual experience. These service types are merely examples of embodiments of the present invention, and the present disclosure includes these examples but is not limited thereto.

An embodiment of the present invention provides a network terminal device communication method. A network terminal device uses a user plane bearer that is between a base station and a P-GW and that is established by a wireless terminal device to transmit user plane data stored by the network terminal device. That is, the network terminal device may be used as a storage extension of the wireless terminal device and may perform service transmission with a network side by serving as a proxy of the wireless terminal device.

In this embodiment of the present invention, the network terminal device uses the user plane bearer that is between the base station and the P-GW and that is established by the wireless terminal device, and performs service transmission by serving as the proxy of the wireless terminal device, and this does not require excessive wireless resources. In addition, when the network terminal device performs service transmission by serving as the proxy of the wireless terminal device, the wireless terminal device may enter a power saving state or release a RRC connection, thereby saving an air interface resource. In addition, the network terminal device is disposed on the network side, that is, a mass storage is disposed on the network side, and therefore it is more secure and convenient for an operator to deploy and to provide service.

Further, it may be understood that in this embodiment of the present invention, transmission between the wireless terminal device and the network side is a real-time service, for example, an event requiring manual intervention such as emergency information or event triggering. However, transmission between the network terminal device and the network side is a non-real-time service, for example, an event requiring no manual intervention such as data collection, periodic detection, and highly complex computing.

For ease of understanding the technical solutions in embodiments of the present invention, in this embodiment of the present invention, the P-GW is used as an example of the network side for description. This is merely an example, and the present disclosure includes this example but is not limited thereto. All shall fall within the protection scope of the present disclosure provided that the network terminal device can replace the wireless terminal device to communicate with the network side.

Figure 1:
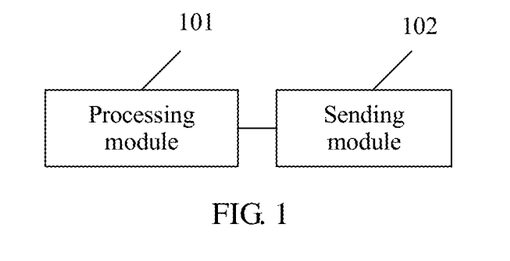
FIG. 1 is a schematic structural diagram of a base station according to an embodiment of the present invention.

FIG. 1 shows a base station according to an embodiment of the present invention, and the base station includes a processing module 101, configured to: after a wireless terminal device establishes an RRC connection to the base station, a control plane connection to a MME, and a user plane bearer with a P-GW, determine that a network terminal device uses a user plane bearer that is between the base station and the P-GW and that is established by the wireless terminal device to transmit user plane data of the network terminal device, where the wireless terminal device and the network terminal device have a same terminal device identifier.

The user plane data may be user plane data that is of the wireless terminal device and that is stored by the network terminal device.

In this embodiment of the present invention, after the wireless terminal device establishes the RRC connection to the base station, the control plane connection to the MME, and the user plane bearer with the P-GW, it is determined that the network terminal device uses the user plane bearer that is between the base station and the P-GW and that is established by the wireless terminal device to transmit the user plane data of the network terminal device. In this way, the base station releases an air interface connection between the wireless terminal device and the base station in time, or the wireless terminal device enters a power saving state, thereby avoiding a prior-art problem that a wireless terminal is always needed in a service transmission process and power of the terminal is wasted and a wireless air interface resource is consumed. In addition, the network terminal device is disposed on the network side, that is, a mass storage is disposed on the network side, and therefore it is more secure and convenient for an operator to deploy and to provide service.

To make the embodiment shown in FIG. 1 more comprehensible, steps and features in the embodiment shown in FIG. 1 are described in detail below.

A location of the network terminal device is specified as follows. The network terminal device is located in the base station as a storage extension of the wireless terminal device. Alternatively, the network terminal device serves as an independent logical network element on an EUTRAN, and is connected to the base station through a wired interface. These two disposing locations of the network terminal device are merely examples of embodiments of the present invention, and the present disclosure includes these examples but is not limited thereto.

The processing module 101 is specifically configured to obtain at least one of control information, radio link quality information, or service QoS of the wireless terminal device. The processing module 101 is further configured to determine, according to the at least one of the control information, the radio link quality information, or the service QoS, that the network terminal device uses the user plane bearer that is between the base station and the P-GW and that is established by the wireless terminal device.

Further, the base station further includes a sending module 102, configured to send a context setup message to the network terminal device, where the context setup message carries at least a base station IP address and a context of the wireless terminal device. The context setup message is used to establish a user plane bearer between the network terminal device and the base station.

The processing module 101 is further configured to release the air interface connection between the wireless terminal device and the base station, or instruct the wireless terminal device to enter the power saving state, thereby saving a wireless air interface resource and saving the power of the wireless terminal.

Further, the processing module 101 is further configured to search a mapping table that is stored in the base station and that is of a wireless terminal device identifier and a network terminal device IP address, for a network terminal device IP address corresponding to the wireless terminal device. The sending module 102 is specifically configured to send the context setup message to a network terminal device corresponding to the network terminal device IP address found by the processing module 101.

Further, the user plane bearer that is between the base station and the P-GW and that is established by the wireless terminal device includes a user plane bearer between the base station and a S-GW, and a user plane bearer between the S-GW and the P-GW.

The wireless terminal device identifier includes an (IMSI), a GUTI, a UE IP address, or a C-RNTI.

Information about the service QoS includes a QCI, an APN-AMBR, or a TFT.

In the base station shown in FIG. 1, an entity device corresponding to the processing module is a processor, and an entity device corresponding to the sending module is a transmitter.

Figure 3:
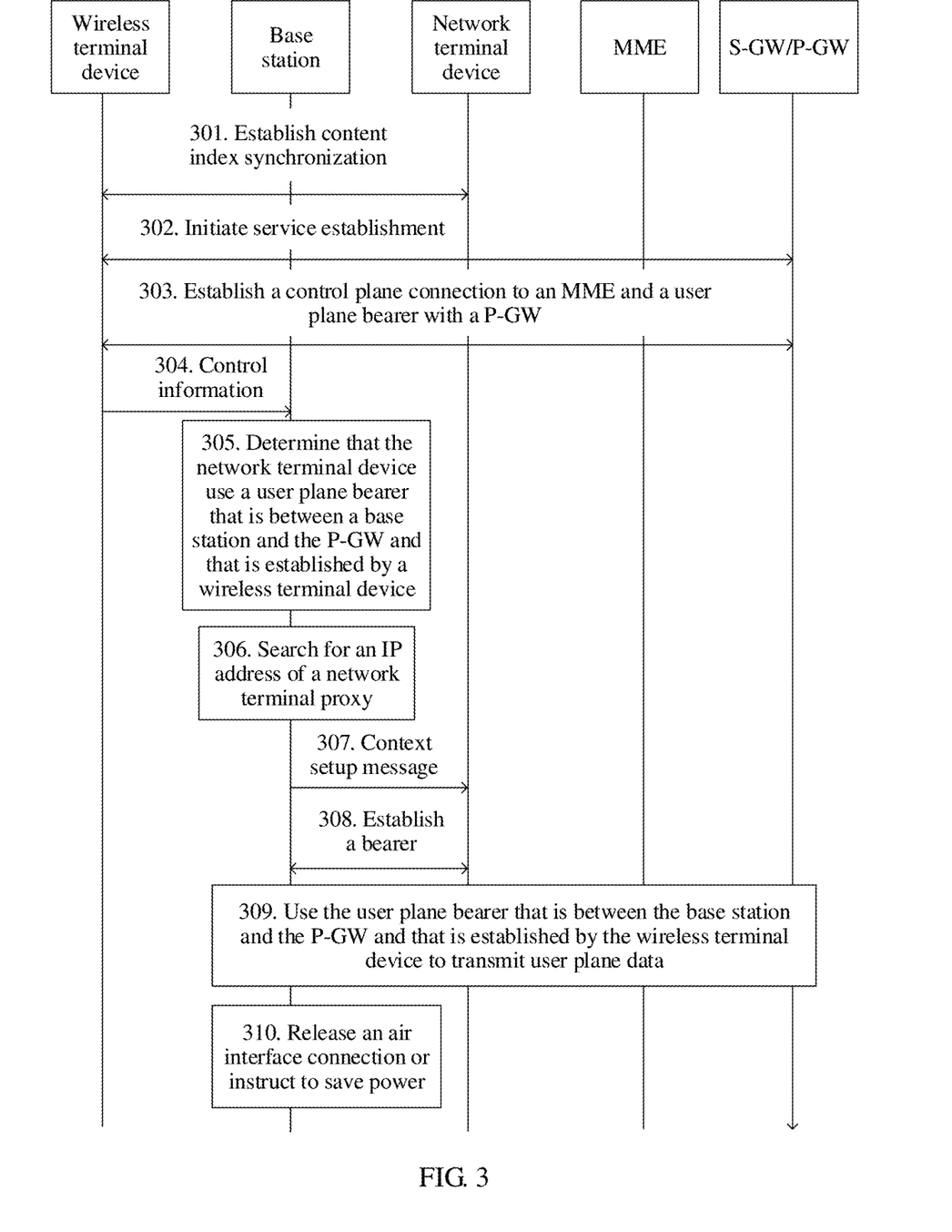
FIG. 3 is a schematic flowchart of a network terminal device communication method according to an embodiment of the present invention.
Figure 5:
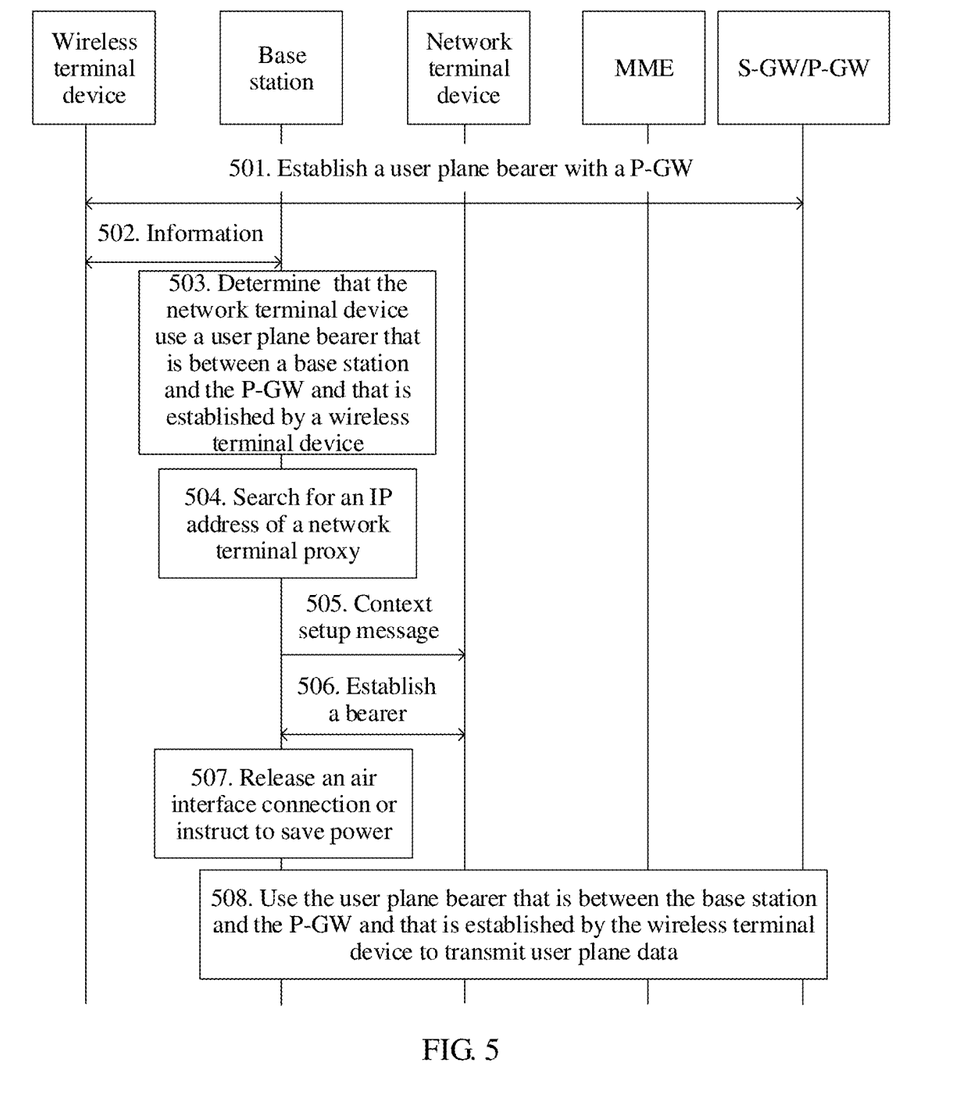
FIG. 5 is a schematic flowchart of another network terminal device communication method according to an embodiment of the present invention.
Figure 7:
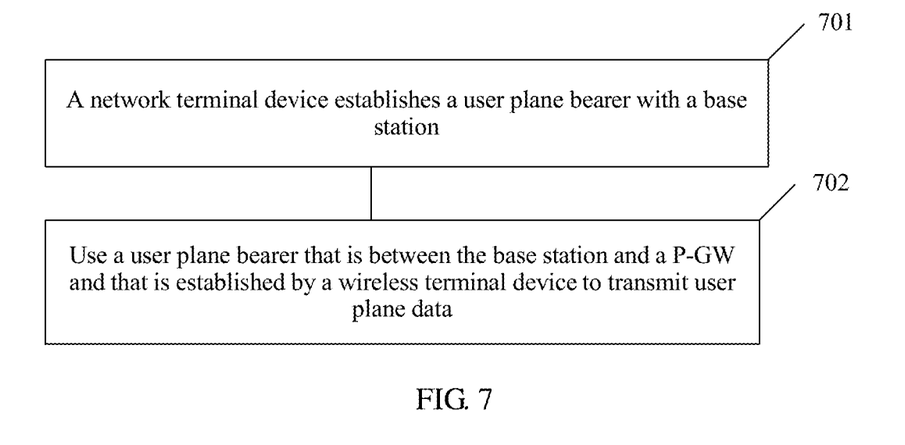
FIG. 7 is a schematic flowchart of another network terminal device data transmission method according to an embodiment of the present invention.

It should be specifically noted that, the base station shown in FIG. 1 may be configured to execute the following method corresponding to the base station and methods shown in FIG. 3, FIG. 5, and FIG. 7.

An embodiment of the present invention describes the network terminal device communication method corresponding to the base station shown in FIG. 1. The system includes a wireless terminal device and a network terminal device, the wireless terminal device and the network terminal device have a same terminal device identifier. The method includes that, after the wireless terminal device establishes an RRC connection to the base station, a control plane connection to an MME, and a user plane bearer with a P-GW, the method determines, by the base station, that the network terminal device uses a user plane bearer that is between the base station and a P-GW and that is established by the wireless terminal device to transmit user plane data of the network terminal device.

A location of the network terminal device may be specified as follows. The network terminal device is located in the base station as a storage extension of the wireless terminal device. Alternatively, the network terminal device serves as an independent logical network element on an EUTRAN and is connected to the base station through a wired interface. These two disposing locations of the network terminal device are merely examples of embodiments of the present invention, and the present disclosure includes these examples but is not limited thereto.

Specifically, the determining, by the base station, that the network terminal device uses a user plane bearer that is between the base station and a P-GW and that is established by the wireless terminal device to transmit user plane data of the network terminal device includes obtaining, by the base station, at least one of control information, radio link quality information, or service QoS of the wireless terminal device, and determining, according to the at least one of the control information, the radio link quality information, or the service QoS, that the network terminal device uses the user plane bearer that is between the base station and the P-GW and that is established by the wireless terminal device.

Further, the method further includes sending, by the base station, a context setup message to the network terminal device, where the context setup message carries at least a base station IP address of the base station and a context of the wireless terminal device. The context setup message is used to establish a user plane bearer between the network terminal device and the base station.

Further, the method further includes releasing, by the base station, an air interface connection between the wireless terminal device and the base station, or instructing the wireless terminal device to enter the power saving state. This saves a wireless air interface resource and saves power of the wireless terminal.

Further, before the base station sends the context setup message to the network terminal device, the method further includes searching, by the base station, a mapping table that is stored in the base station and that is of a wireless terminal device identifier and a network terminal device IP address, for a network terminal device IP address corresponding to the wireless terminal device.

Sending, by the base station, a context setup message to the network terminal device includes sending, by the base station, the context setup message to the network terminal device corresponding to the found network terminal device IP address.

Content included by the wireless terminal device identifier is the same as that of the wireless terminal device identifier in the embodiment shown in FIG. 1.

Content included by information about the service QoS is the same as the QoS information in the embodiment shown in FIG. 1.

The user plane bearer that is between the base station and the P-GW and that is established by the wireless terminal device includes: a user plane bearer between the base station and the S-GW, and a user plane bearer between the S-GW and the P-GW.

Figure 2:
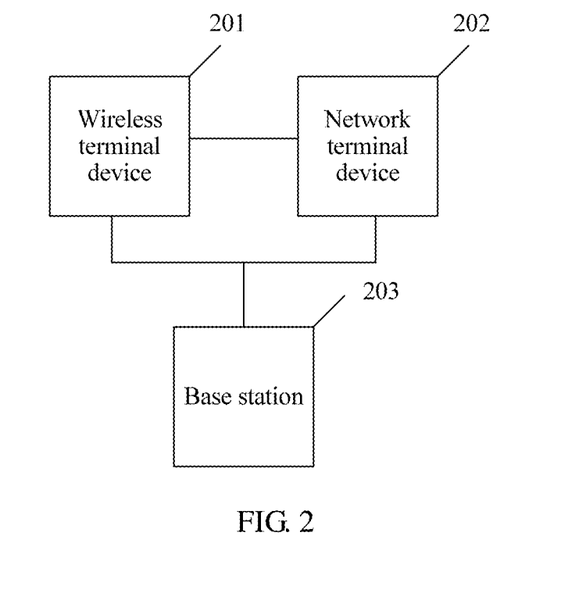
FIG. 2 is a network terminal device communication system according to an embodiment of the present invention.

FIG. 2 shows a network terminal device communication system according to an embodiment of the present invention, including a wireless terminal device 201, a network terminal device 202, and the base station 203 in FIG. 1, where the wireless terminal device 201 and the network terminal device 202 have a same terminal device identifier.

A location of the network terminal device 202 may be specified as follows. The network terminal device 202 is located in the base station 203 as a storage extension of the wireless terminal device 201. Alternatively, the network terminal device 202 serves as an independent logical network element on an EUTRAN, and is connected to the base station 203 through a wired interface. These two disposing locations of the network terminal device are merely examples of embodiments of the present invention, and the present disclosure includes these examples but is not limited thereto.

In this embodiment of the present invention, after the wireless terminal device establishes an RRC connection to the base station, a control plane connection to an MME, and a user plane bearer with a P-GW, it is determined that the network terminal device uses a user plane bearer that is between the base station and the P-GW and that is established by the wireless terminal device to transmit user plane data of the network terminal device. In this way, the base station releases an air interface connection between the wireless terminal device and the base station in time, or the wireless terminal device enters a power saving state, thereby avoiding a prior-art problem that a wireless terminal is always needed in a service transmission process and power of the terminal is wasted and a wireless air interface resource is consumed. In addition, the network terminal device is disposed on a network side, that is, a mass storage is disposed on the network side, and therefore it is more secure and convenient for an operator to deploy and to provide service.

FIG. 3 shows another network terminal device communication method according to an embodiment of the present invention. Step 301 is an optional step, and may be executed before or after step 302, and this is not specifically limited in the present disclsosure. The method includes the following steps.

301. A wireless terminal device and a network terminal device establish content index synchronization, where the wireless terminal device and the network terminal device have a same terminal device identifier.

It should be specifically noted that, the wireless terminal device may use at least either of the following manners to establish the content index synchronization with the network terminal device. Certainly, these two manners are merely examples of this embodiment of the present invention, and the present disclosure includes these examples but is not limited thereto.

Manner 1: The wireless terminal device establishes, by querying an application (APP) of an operator, the content index synchronization with the network terminal device having the same terminal identifier as the wireless terminal device.

Manner 2: The wireless terminal device establishes, by using a man-machine interface (MMI), the content index synchronization with the network terminal device having the same terminal identifier as the wireless terminal device.

302. The wireless terminal device initiates service establishment.

303. The wireless terminal device establishes a control plane connection between the wireless terminal device and an MME, and a user plane bearer between the wireless terminal device and a P-GW.

Figure 4:
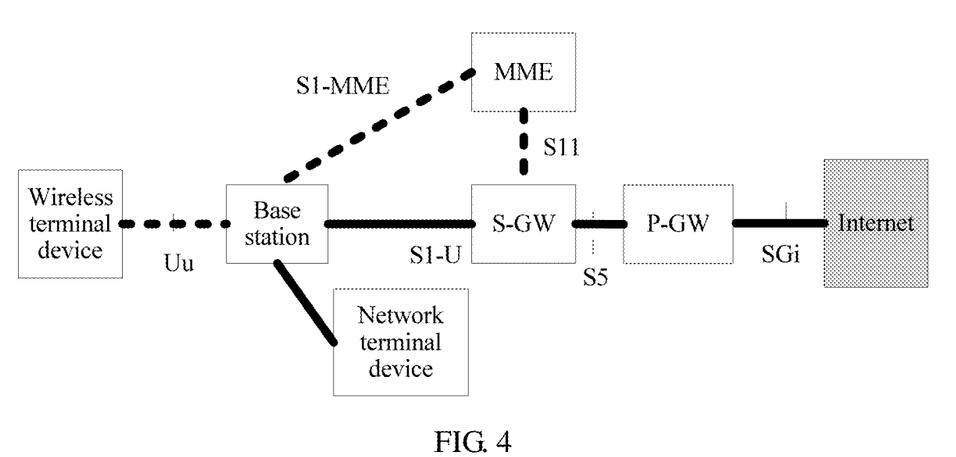
FIG. 4 is a schematic diagram of establishment of a control plane connection and a user plane bearer according to an embodiment of the present invention.

Specifically, as shown by a dashed line in FIG. 4, the control plane connection includes an RRC signaling connection and a dedicated S1 connection. The RRC signaling connection is an air interface signaling connection between the wireless terminal device and the base station, and the dedicated S1 connection is a signaling connection between the base station and the MME.

Specifically, as shown by a solid line in FIG. 4, the user plane bearer includes a user plane bearer between the network terminal device and the base station, a user plane bearer between the base station and the S-GW, and a user plane bearer between the S-GW and the P-GW.

Further, the user plane bearer between the wireless terminal device and the base station may be established through a Uu interface, the user plane bearer between the base station and the S-GW may be established through an S1-U interface, and the user plane bearer between the S-GW and the P-GW may be established through an S5 interface.

Specifically, when the wireless terminal device is in an EPS (evolved packet system) connection management idle (ECM-IDLE) state, a network maintains only some user plane bearers and control plane connections for the wireless terminal device.

304. The wireless terminal device sends at least one of control information, radio link quality information, or service QoS of the wireless terminal device to a base station.

305. The base station determines, according to the at least one of the control information, the radio link quality information, or the service QoS of the wireless terminal device, whether the network terminal device uses the user plane bearer that is between the base station and the P-GW and that is established by the wireless terminal device.

Specifically, the control information is an uplink information that is sent by the wireless terminal device to the base station. The uplink information includes power saving instruction information or instruction information that requests the network terminal device to perform service transmission.

Specifically, the radio link quality information is for the base station to determine a case in which a radio channel condition is changed and may be embodied as higher cell load or worse radio channel quality.

Specifically, the service QoS is QoS of upload and download services, a non-real-time service, a service that does not require direct manual experience, and the like. These services are merely examples of this embodiment of the present invention, and the present disclosure includes these examples but is not limited thereto.

306. If it is determined in step 305 that the network terminal device uses the user plane bearer that is between the base station and the P-GW and that is established by the wireless terminal device, the base station searches a mapping table that is stored in the base station and that is of a wireless terminal device identifier and a network terminal device IP address, for a network terminal device IP address corresponding to the wireless terminal device.

307. The base station sends a context setup message to the network terminal device corresponding to the found network terminal device IP address.

Specifically, the context setup message carries a base station IP address and a context of the wireless terminal device.

The context of the wireless terminal device may include at least a wireless terminal device identifier and information about the service QoS.

The wireless terminal device identifier may include but is not limited to the following examples: an IMSI, a GUTI, a UE IP address; or a C-RNTI.

The information about the service QoS may include but is not limited to the following examples: a QCI, an APN-AMBR; a TFT; or a bearer-related communication context.

Further, the bearer-related communication context includes but is not limited to the following examples an evolved packet system bearer ID (EPS bearer ID) or a dedicated radio bearer ID (DRB ID).

308. The network terminal device obtains a context of the wireless terminal device, and establishes, according to the context, a user plane bearer between the network terminal device and a base station corresponding to a base station IP address.

309. Use the user plane bearer that is between the base station and the P-GW and that is established by the wireless terminal device to transmit user plane data.

310. The base station releases an air interface connection between the wireless terminal device and the base station, or instructs the wireless terminal device to enter a power saving state.

It should be specifically noted that, an execution sequence between step 309 and 310 is not limited.

In this embodiment of the present invention, after the wireless terminal device establishes an RRC connection to the base station, the control plane connection to the MME, and the user plane bearer with the P-GW, it is determined that the network terminal device uses the user plane bearer between the wireless terminal device and the P-GW to transmit the user plane data of the network terminal device. In this way, the base station releases an air interface connection between the wireless terminal device and the base station in time, or the wireless terminal device enters the power saving state, thereby avoiding a prior-art problem that a wireless terminal is always needed in a service transmission process and power of the wireless terminal is wasted and a wireless air interface resource is consumed. In addition, the network terminal device is disposed on a network side, that is, a mass storage is disposed on the network side, and therefore it is more secure and convenient for an operator to deploy and to provide service.

Figure 9:
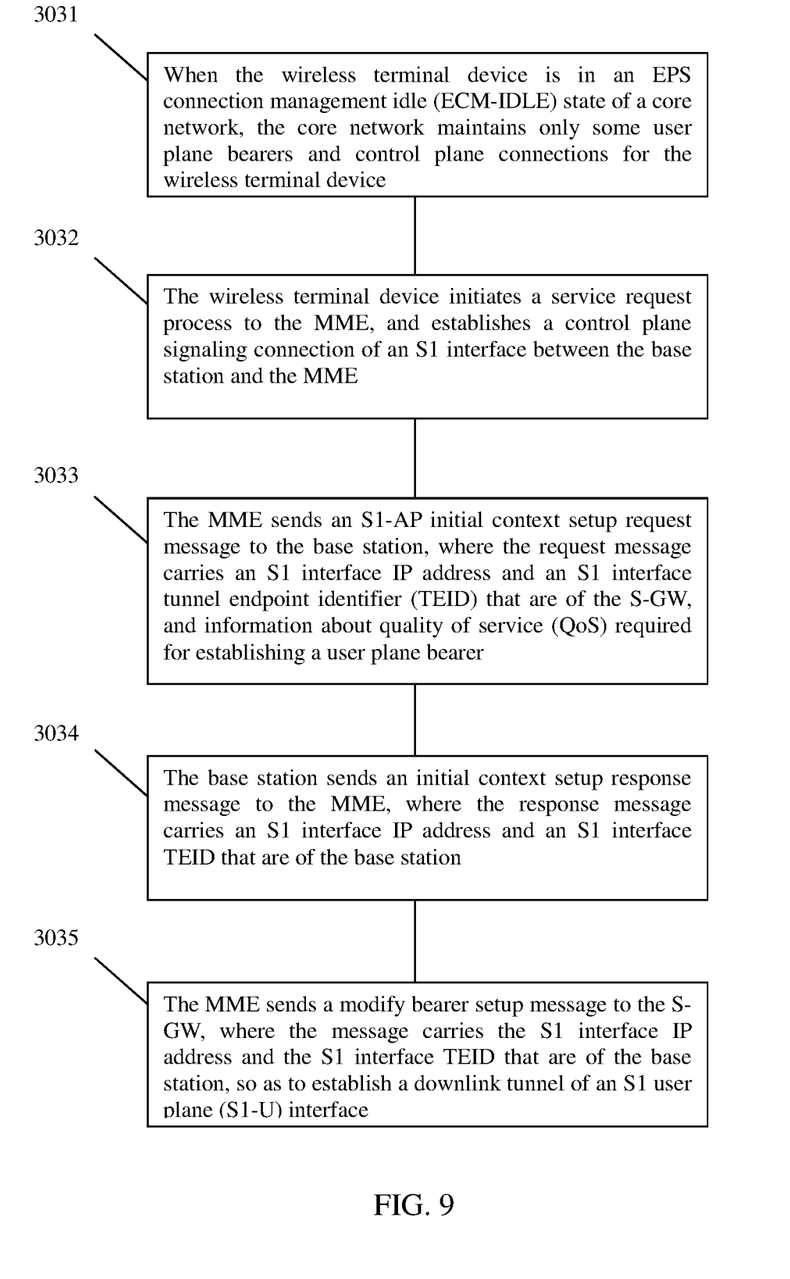
FIG. 9 is a schematic flowchart of a wireless terminal device establishing a signaling plan connection between the wireless terminal device and the MME, and a user plane bearer between the wireless terminal device and the S-GW/P-GW.

In step 303, the wireless terminal device establishes a signaling plane connection (denoted by a dashed line) between the wireless terminal device and the MME, and establishes a user plane bearer (denoted by a solid line) between the network terminal device and the S-GW/P-GW. Details are illustrated in FIG. 9 and may be as follows.

3031. When the wireless terminal device is in an EPS connection management idle (ECM-IDLE) state of a core network, the core network maintains only some user plane bearers and control plane connections for the wireless terminal device, that is, a control plane maintains a GPRS Tunneling Protocol-Control Plane (GTP-C) connection of a context of the wireless terminal device, and a user plane maintains a GPRS Tunneling Protocol-User Plane (GTP-U) connection of the wireless terminal device.

The maintained GTP-C connection includes an Sii interface between the MME and the S-GW, and an S5 interface between the S-GW and the P-GW. The maintained GTP-U connection includes the S5 interface between the S-GW and the P-GW.

3032. The wireless terminal device initiates a service request process to the MME, and establishes a control plane signaling connection of an S1 interface between the base station and the MME.

3033. The MME sends an S1-AP initial context setup request message to the base station, where the request message carries an S1 interface IP address and an S1 interface tunnel endpoint identifier (TEID) that are of the S-GW, and information about quality of service (QoS) required for establishing a user plane bearer. In this way, the base station establishes an uplink tunnel of the S1 user plane (S1-U) interface, and establishes a wireless bearer on a wireless side for the wireless terminal device.

3034. The base station sends an initial context setup response message to the MME, where the response message carries an S1 interface IP address and an S1 interface TEID that are of the base station.

3035. The MME sends a modify bearer setup message to the S-GW, where the message carries the S1 interface IP address and the S1 interface TEID that are of the base station, so as to establish a downlink tunnel of an S1 user plane (S1-U) interface.

The user plane bearer from the wireless terminal device to the P-GW is established by using a service request process from 3031 to 3036.

FIG. 5 shows another network terminal device communication method according to an embodiment of the present invention, and the method includes the following steps.

501. A wireless terminal device establishes a user plane bearer with a P-GW.

502. The wireless terminal device sends at least one of control information, radio link quality information, or service QoS of the wireless terminal device to a base station.

For specific content of the control information, the radio link quality information, and the service QoS, refer to the embodiment shown in FIG. 4.

503. The base station determines, according to the at least one of the control information, the radio link quality information, or the service QoS, whether a network terminal device having a same terminal device identifier as the wireless terminal device uses a user plane bearer that is between the base station and the P-GW and that is established by the wireless terminal device.

504. If it is determined in step 503 that the network terminal device uses the user plane bearer that is between the base station and the P-GW and that is established by the wireless terminal device, the base station searches, according to a wireless terminal device identifier, a mapping table that is stored in the base station and that is of a wireless terminal device identifier and a network terminal device IP address, for a corresponding network terminal device IP address.

505. The base station sends a context setup message to a network terminal device corresponding to the network terminal device IP address.

Specifically, the context setup message carries at least a base station IP address and a context of the wireless terminal device.

It should be specifically noted that, the context of the wireless terminal device is the same as the context of the wireless terminal device in the embodiment shown in FIG. 3. Details are not described herein.

506. The network terminal device obtains a context of the wireless terminal device, and establishes a user plane bearer between the network terminal device and a base station corresponding to the base station IP address.

507. The base station releases an air interface connection between the wireless terminal device and the base station, or instructs the wireless terminal device to enter a power saving state.

508. The network terminal device uses the user plane bearer that is between the base station and the P-GW and that is established by the wireless terminal device to transmit user plane data.

The transmitted user plane data may be service data stored by the network terminal device.

It should be specifically noted that, an execution sequence between step 507 and 508 is not limited.

In this embodiment of the present invention, after the wireless terminal device establishes an RRC connection to the base station, a control plane connection to an MME, and the user plane bearer with the P-GW, it is determined that the network terminal device uses the user plane bearer that is between the base station and the P-GW and that is established by the wireless terminal device to transmit the user plane data of the network terminal device. In this way, the base station releases the air interface connection between the wireless terminal device and the base station in time, or the wireless terminal device enters the power saving state, thereby avoiding a prior-art problem that a wireless terminal is always needed in a service transmission process and power of the terminal is wasted and a wireless air interface resource is consumed. In addition, the network terminal device is disposed on a network side, that is, a mass storage is disposed on the network side, and therefore it is more secure and convenient for an operator to deploy and to provide service.

It should be specifically noted that, the network terminal device and the wireless terminal device in this embodiment of the present invention have the same terminal device identifier. The network terminal device may be located on the network side as a storage extension of the wireless terminal device, for example, may be located in the base station, or may serve as an independent logical network element on an EUTRAN, and is connected to the base station through a wired interface.

Figure 6:
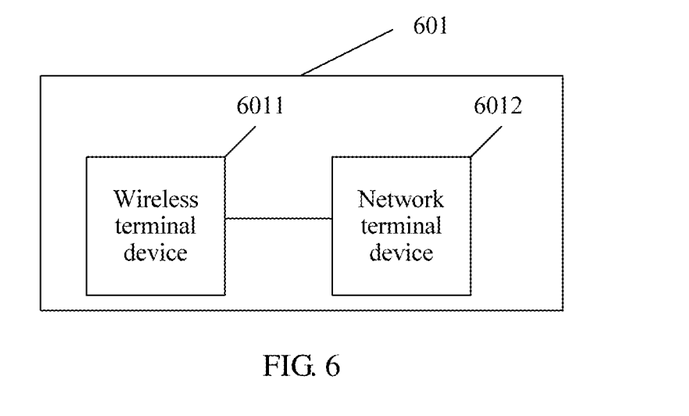
FIG. 6 is a schematic structural diagram of a new terminal device according to an embodiment of the present invention.

FIG. 6 shows a new terminal device according to an embodiment of the present invention. A new terminal device 601 includes a wireless terminal device 6011 and a network terminal device 6012. The network terminal device 6012 and the wireless terminal device 6011 have a same terminal device identifier. The network terminal device 6012 may be located on a network side as a storage extension of the wireless terminal device 6011, for example, may be located in a base station, or may serve as an independent logical network element on an EUTRAN, and is connected to the base station through a wired interface.

It should be specifically noted that, the new terminal shown in FIG. 6 may be configured to execute the foregoing methods shown in FIG. 3 and FIG. 5, and the following method shown in FIG. 7.

FIG. 7 shows another network terminal device data transmission method according to an embodiment of the present invention. A network terminal device is located in a base station as a storage extension of a wireless terminal device; or the network terminal device serves as an independent logical network element on an EUTRAN, and is connected to the base station through a wired interface. The network terminal device and the wireless terminal device have a same terminal device identifier, and the method includes the following steps.

701. After the wireless terminal device establishes a control plane connection to a MME and a user plane bearer with a P-GW, the network terminal device establishes a user plane bearer with the base station.

702. The network terminal device uses a user plane bearer that is between the base station and the P-GW and that is established by the wireless terminal device to transmit user plane data, where the wireless terminal device and the network terminal device have the same terminal device identifier.

Further, the method further includes the following.

The network terminal device receives a context setup message sent by the base station, and the context setup message carries at least a base station IP address and a context of the wireless terminal device.

Further, that the network terminal device establishes a user plane bearer with the base station includes the following.

The network terminal device establishes, according to the context of the wireless terminal device, a user plane bearer between the network terminal device and a base station corresponding to the base station IP address.

Specifically, the context of the wireless terminal device includes a wireless terminal device identifier and information about service QoS.

Specifically, the control plane connection includes a RRC signaling connection and a dedicated S1 connection. The RRC signaling connection is an air interface signaling connection between the wireless terminal device and the base station, and the dedicated S1 connection is a signaling connection between the base station and the MME.

Specifically, the user plane bearer includes a user plane bearer between the wireless terminal device and the base station, the user plane bearer between the base station and the S-GW, and a user plane bearer between the S-GW and the P-GW.

Specifically, the wireless terminal device identifier includes an IMSI, a GUTI, a wireless terminal device IP address, or C-RNTI.

Specifically, the information about the service QoS includes a QCI, a APN-AMBR, or a TFT.

For a beneficial effect of this embodiment of the present invention, refer to the beneficial effect of the embodiment shown in FIG. 3, and details are not described herein.

Figure 8:
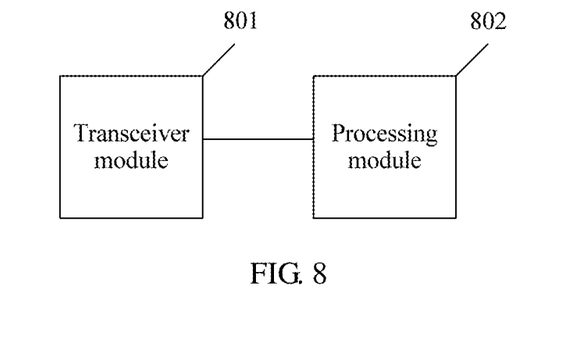
FIG. 8 is a schematic structural diagram of a network terminal device according to an embodiment of the present invention.

FIG. 8 shows a network terminal device according to an embodiment of the present invention. The network terminal device is located in a base station as a storage extension of a wireless terminal device. Alternatively, the network terminal device serves as an independent logical network element on an EUTRAN, and is connected to the base station through a wired interface. The network terminal device and the wireless terminal device have a same terminal device identifier, and the network terminal device includes the following.

The network terminal device includes a processing module 801, configured to, after the wireless terminal device establishes a control plane connection to a mobility management entity (MME) and a user plane bearer with a packet data network gateway (P-GW), establish a user plane bearer with the base station.

The network terminal device further includes a transceiver module 802, configured to use the user plane bearer with the base station that is established by the processing module 801 and a user plane bearer that is between the base station and the P-GW and that is established by the wireless terminal device to transmit user plane data, where the wireless terminal device and the network terminal device have the same terminal device identifier.

Specifically, the network terminal device is located in the base station as a storage extension of the wireless terminal device. Alternatively, the network terminal device serves as an independent logical network element on the EUTRAN, and is connected to the base station through a wired interface.

Further, the transceiver module 802 is further configured to receive a context setup message sent by the base station, and the context setup message carries at least a base station IP address and a context of the wireless terminal device.

Further, the processing module 801 is further configured to establish, according to the context that is of the wireless terminal device and that is received by the transceiver module, a user plane bearer between the network terminal device and a base station corresponding to the base station IP address.

Specifically, the context that is of the wireless terminal device and that is received by the transceiver module includes a wireless terminal device identifier and information about service QoS.

Specifically, for specific content included by the wireless terminal device identifier, refer to the embodiment shown in FIG. 3.

Specifically, for specific content included by the control plane connection, refer to the embodiment shown in FIG. 3.

Specifically, for specific content included by the user plane bearer, refer to the embodiment shown in FIG. 3.

For a beneficial effect of this embodiment of the present invention, refer to the beneficial effect of the embodiment shown in FIG. 3, and details are not described herein.

It should be specifically noted that, the network terminal device shown in FIG. 8 may be configured to execute the foregoing methods shown in FIG. 2, FIG. 3, FIG. 5, and FIG. 7.

It should be specifically noted that, in this embodiment of the present invention, an entity device corresponding to the processing module is a processor, and an entity device corresponding to the transceiver module is a transceiver.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of this application.

The invention claimed is:

1. A base station comprising:
   a processor; and
   a non-transitory computer-readable storage medium coupled to the processor and storing programming instructions for execution by the processor, the programming instructions instructing the processor to:
   determine that a network terminal device uses a user plane bearer between the base station and a packet data network gateway (P-GW) to transmit user plane data of the network terminal device, wherein the user plane bearer is established by a wireless terminal device, wherein the wireless terminal device and the network terminal device are separate devices and have the same terminal device identifier, wherein determining that the network terminal device uses the user plane bearer occurs after the wireless terminal device has established a radio resource control (RRC) connection to the base station, a control plane connection to a mobility management entity (MME), and the user plane bearer with the P-GW, and wherein the network terminal device is located on a network side as a storage extension of the wireless terminal device; and
   while the network terminal device uses the user plane bearer between the base station and the P-GW to transmit user plane data, release an air interface connection between the wireless terminal device and the base station or instruct the wireless terminal device to enter a power saving state.

2. The base station according to claim 1, wherein the programming instructions instruct the processor to obtain control information, radio link quality information, or service quality of service (QoS) of the wireless terminal device and determine, according to the at least one of the control information, the radio link quality information, or the service QoS, that the network terminal device uses the user plane bearer that is between the base station and the P-GW and that is established by the wireless terminal device.

3. The base station according to claim 2,
   wherein a wireless terminal device identifier comprises an international mobile subscriber identity (IMSI), a globally unique temporary identity (GUTI), a user equipment (UE) internet protocol (IP) address, or a cell radio network temporary identifier (C-RNTI), and
   wherein information about the service QoS comprises a quality of service class identifier (QCI), an access point name-aggregate maximum bit rate (APN-AMBR), or a traffic flow template (TFI).

4. The base station according to claim 1, further comprising a transceiver, wherein the programming instructions instruct the processor to control the transceiver to send a context setup message to the network terminal device, wherein the context setup message comprises a base station internet protocol (IP) address and a service context of the wireless terminal device, and wherein the network terminal device uses the context setup message to establish the user plane bearer between the network terminal device and the base station.

5. The base station according to claim 4, wherein the programming instructions further instruct the processor to:
   prior to sending the context setup message, search a mapping table stored in the base station; and
   find a network terminal device IP address corresponding to the wireless terminal device in the mapping table, wherein the network terminal device which is sent the context setup message corresponds to the network terminal device IP address found in the mapping table.

6. The base station according to claim 1, wherein the user plane bearer between the base station and the P-GW comprises a first user plane bearer between the base station a serving gateway (S-GW), and a second user plane bearer between the S-GW and the P-GW.

7. A method comprising:
   determining, by a base station, that a network terminal device uses a user plane bearer between the base station and a packet data network gateway (P-GW) to transmit user plane data of the network terminal device, wherein the user plane bearer is established by a wireless terminal device, wherein the wireless terminal device and the network terminal device are separate devices and have the same terminal device identifier, wherein determining that the network terminal device uses the user plane bearer is performed after the wireless terminal device establishes a radio resource control (RRC) connection to a base station, a control plane connection to a mobility management entity (MME), and the user plane bearer with the P-GW, and wherein the network terminal device is located on a network side as a storage extension of the wireless terminal device; and
   while the network terminal device uses the user plane bearer between the base station and the P-GW to transmit user plane data, releasing an air interface connection between the wireless terminal device and the base station or instructing the wireless terminal device to enter a power saving state.

8. The method according to claim 7, further comprising:
   obtaining control information, radio link quality information, or service quality of service (QoS) of the wireless terminal device; and
   determining, by the base station according to the control information, the radio link quality information, or the service QoS, that the network terminal device uses the user plane bearer between the base station and the P-GW and established by the wireless terminal device.

9. The method according to claim 8,
wherein a wireless terminal device identifier comprises an international mobile subscriber identity (IMSI), a globally unique temporary identity (GUTI), a user equipment (UE) IP address or a cell radio network temporary identifier (C-RNTI), and
wherein information about the service QoS comprises: a quality of service class identifier (QCI), an access point name-aggregate maximum bit rate (APN-AMBR) or a traffic flow template (TFT).

10. The method according to claim 7, further comprising sending, by the base station, a context setup message to the network terminal device, wherein the context setup message comprises a base station internet protocol (IP) address and a service context of the wireless terminal device, wherein the network terminal device uses the context setup message to establish the user plane bearer between the network terminal device and the base station.

11. The method according to claim 10, further comprising:
prior to sending the context setup message, searching, by the base station, a mapping table stored in the base station; and
finding a network terminal device IP address corresponding to the wireless terminal device in the mapping table, wherein the network terminal device which is sent the context setup message corresponds to the network terminal device IP address found in the mapping table.

12. The method according to claim 7, wherein the user plane bearer comprises a first user plane bearer between the base station and a serving gateway (S-GW), and a second user plane bearer between the S-GW and the P-GW.

13. A network terminal device comprising:
a processor; and
a non-transitory computer-readable storage medium coupled to the processor and storing programming instructions for execution by the processor, the programming instructions instructing the processor to:
after a wireless terminal device establishes a control plane connection to a mobility management entity (MME) and a first user plane bearer with a packet data network gateway (P-GW), establish a second user plane bearer with a base station; and
use the second user plane bearer with the base station and a third user plane bearer that is between the base station and the P-GW and that is established by the wireless terminal device to transmit user plane data, wherein, while the user plane data is transmitted, an air interface connection between the wireless terminal device and the base station is released or the wireless terminal device is instructed to enter a power saving state,
wherein the wireless terminal device and the network terminal device are separate devices and have the same terminal device identifier, and wherein the network terminal device is located on a network side as storage extension of the wireless terminal device and is connected to the base station through a wired interface.

14. A system comprising:
the wireless terminal device and the network terminal device according to claim 13, wherein the wireless terminal device and the network terminal device are separate devices that have the same terminal device identifier.

15. The system according to claim 14, wherein the wireless terminal device is configured to establish an RRC connection to a base station, the control plane connection to the MME, and the first user plane bearer with the P-GW.

16. The system according to claim 14, wherein the user plane data comprises stored data files.

17. The network terminal device of claim 13, wherein the programming instructions further instruct the processor to receive a context setup message from the base station, and wherein the context setup message carries at least a base station IP address and a context of the wireless terminal device.

18. The network terminal device of claim 17, wherein the programming instructions further instruct the processor to establish, according to the context of the wireless terminal device, the second user plane bearer between the network terminal device and a base station corresponding to the base station IP address.

* * * * *

UNITED STATES PATENT AND TRADEMARK OFFICE
CERTIFICATE OF CORRECTION

PATENT NO. : 10,728,794 B2
APPLICATION NO. : 15/899272
DATED : July 28, 2020
INVENTOR(S) : Xin Xiong Page 1 of 1

It is certified that error appears in the above-identified patent and that said Letters Patent is hereby corrected as shown below:

In the Claims

In Column 18, Line 10, Claim 3, delete "(TFI)" and insert --(TFT)--.

In Column 18, Lines 33-34, Claim 6, delete "the base station a serving gateway" and insert --the base station and a serving gateway--.

Signed and Sealed this
Thirteenth Day of October, 2020

Andrei Iancu
*Director of the United States Patent and Trademark Office*